(12) United States Patent
Paralikar et al.

(10) Patent No.: US 10,696,313 B2
(45) Date of Patent: Jun. 30, 2020

(54) VEHICLE CONTROL SYSTEM

(71) Applicant: General Electric Company, Schenectady, NY (US)

(72) Inventors: Ashish Anil Paralikar, Bangalore (IN); Tharunendra Sekhar, Bangalore (IN); Praful Babuji Vihol, Bangalore (IN); Dibyajyoti Pati, Bangalore (IN); Hansa Narayana, Bangalore (IN); Prakarsh Paritosh, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 231 days.

(21) Appl. No.: 15/883,856

(22) Filed: Jan. 30, 2018

(65) Prior Publication Data

US 2018/0222502 A1    Aug. 9, 2018

Related U.S. Application Data

(60) Provisional application No. 62/455,920, filed on Feb. 7, 2017.

(51) Int. Cl.
*B61L 3/04* (2006.01)
*B61C 15/00* (2006.01)
(Continued)

(52) U.S. Cl.
CPC .............. *B61L 3/006* (2013.01); *B61C 15/00* (2013.01); *B61C 15/14* (2013.01); *B61L 3/008* (2013.01);
(Continued)

(58) Field of Classification Search
CPC ...... B61L 3/003; B61L 3/006; B61L 27/0022; B61L 27/0038; B61L 27/04; B61C 15/00; B61C 15/14
(Continued)

(56) References Cited

U.S. PATENT DOCUMENTS 7,751,961 B2   7/2010 Salman et al.
8,055,424 B2   11/2011 Salman et al.
(Continued)

FOREIGN PATENT DOCUMENTS

KR   10-2000-0049825 A   8/2000

OTHER PUBLICATIONS

International Search Report and Written Opinion issued in connection with corresponding PCT Application No. PCT/US2018/017304 dated May 23, 2018.
(Continued)

*Primary Examiner* — Tan Q Nguyen
(74) *Attorney, Agent, or Firm* — John P. Darling; The Small Patent Law Group, LLC (57) ABSTRACT

A vehicle control system determines a predicted location of wheel slip for an upcoming trip of a vehicle system by comparing a vehicle characteristic, route characteristic, and/or weather characteristic associated with the upcoming trip with a vehicle characteristic, route characteristic, and/or weather characteristic associated with a previous detection of wheel slip. Movement of the vehicle system is controlled during the upcoming trip by reducing tractive effort generated by a leading vehicle of the vehicle system relative to a trailing vehicle of the vehicle system during movement over the predicted location, reducing tractive effort generated by a leading axle in a vehicle of the vehicle system relative to a trailing axle of the vehicle during movement over the predicted location, and/or directing an adhesion modifying device to automatically dispense an adhesion modifying substance onto the predicted location.

20 Claims, 7 Drawing Sheets (51) Int. Cl.
  *B61L 3/00* (2006.01)
  *B61L 27/00* (2006.01)
  *B61L 27/04* (2006.01)
  *B61C 15/14* (2006.01)

(52) U.S. Cl.
  CPC ....... *B61L 27/0022* (2013.01); *B61L 27/0038* (2013.01); *B61L 27/04* (2013.01)

(58) Field of Classification Search
  USPC .......................................................... 701/19
  See application file for complete search history.

(56) References Cited

U.S. PATENT DOCUMENTS

| | | | |
|---|---|---|---|
| 8,155,845 B2* | 4/2012 | Hara | B60C 11/00 |
| | | | 701/34.2 |
| 8,374,740 B2 | 2/2013 | Druenert et al. | |
| 9,096,244 B2 | 8/2015 | Meyer et al. | |
| 9,102,309 B2 | 8/2015 | Tarnow et al. | |
| 9,308,921 B2 | 4/2016 | Worden et al. | |
| 2010/0023190 A1 | 1/2010 | Kumar et al. | |
| 2011/0221265 A1 | 9/2011 | Busack et al. | |
| 2012/0290173 A1* | 11/2012 | Irie | B60W 30/10 |
| | | | 701/41 |
| 2014/0058570 A1* | 2/2014 | Kumar | B61C 15/00 |
| | | | 700/283 |
| 2014/0307247 A1 | 10/2014 | Zhu et al. | |
| 2014/0309885 A1 | 10/2014 | Ricci | |
| 2014/0336935 A1 | 11/2014 | Zhu et al. | |
| 2014/0343756 A1* | 11/2014 | Nefcy | B60W 10/023 |
| | | | 701/2 |
| 2014/0350767 A1 | 11/2014 | Fries | |
| 2015/0051759 A1 | 2/2015 | Worden | |
| 2015/0051760 A1 | 2/2015 | Worden | |
| 2015/0217790 A1 | 8/2015 | Golden et al. | |
| 2015/0251664 A1* | 9/2015 | Zagorski | B62D 6/003 |
| | | | 701/41 |
| 2015/0298577 A1* | 10/2015 | Kobayashi | B60L 15/20 |
| | | | 701/22 |
| 2016/0054471 A1 | 2/2016 | Frelich et al. | |
| 2016/0137208 A1* | 5/2016 | Powers | B60W 40/06 |
| | | | 701/36 |
| 2016/0176408 A1* | 6/2016 | Lynch | B60W 40/064 |
| | | | 701/23 |
| 2016/0257323 A1 | 9/2016 | Meyer et al. | |

OTHER PUBLICATIONS

Australian Examination Report No. 1 for related Australian Application No. 2018219837 dated Apr. 16, 2020.

* cited by examiner

VEHICLE CONTROL SYSTEM

CROSS-REFERENCE TO RELATED APPLICATIONS

This application claims priority to U.S. Provisional Application No. 62/455,920, which was filed on Feb. 7, 2017, and the entire disclosure of which is incorporated herein by reference.

FIELD

The inventive subject matter described herein relates to systems that control movements of vehicles.

BACKGROUND

Vehicles traveling along route may encounter locations along the route where wheel slip occurs. Wheel slip involves one or more wheels of a vehicle (that engage the surface of the route on which the vehicle is traveling) moving relative to, or sliding, on the surface. Wheel slip can occur when a wheel rotates faster than the speed at which the vehicle is otherwise moving on the surface of the route.

Wheel slip can be detrimental in many respects. Wheel slip can wear down wheels of the vehicle, and can involve the vehicle consuming more fuel than is needed to propel the vehicle along the route. Preventive actions can be taken to reduce or prevent wheel slip, such as applying sand to the surface of the route. But, it can be difficult to accurately and precisely identify the circumstances when and where wheel slip is likely to occur. As a result, some vehicles can apply sand to a route in order to avoid wheel slip, even if wheel slip is unlikely to occur.

BRIEF DESCRIPTION

In one embodiment, a control system includes one or more processors configured to determine one or more predicted locations of wheel slip for an upcoming trip of a vehicle system by comparing one or more vehicle characteristics, route characteristics, or weather characteristics associated with the upcoming trip of the vehicle system with one or more vehicle characteristics, route characteristics, or weather characteristics associated with one or more previous detections of wheel slip. The one or more processors are configured to control movement of the vehicle system during the upcoming trip by one or more of reducing tractive effort generated by a leading vehicle of the vehicle system relative to a trailing vehicle of the vehicle system during movement over the one or more predicted locations, reducing tractive effort generated by a leading axle in a vehicle of the vehicle system relative to a trailing axle of the vehicle during movement over the one or more predicted locations, or directing an adhesion modifying device to automatically dispense an adhesion modifying substance onto the one or more predicted locations.

In one embodiment, a control system includes one or more processors configured to determine one or more of a characteristic of a first vehicle system that experienced wheel slip at a location along one or more routes, a characteristic of the one or more routes where the wheel slip occurred, or a characteristic of a weather condition in which the wheel slip occurred during movement of the first vehicle system, the one or more processors also configured to determine one or more of a characteristic of a second vehicle system, a characteristic of one or more routes to be traveled by the second vehicle system, or a weather condition in which the second vehicle system is or will be traveling. The one or more processors are configured to determine a predicted location where wheel slip will occur for the second vehicle system absent a change to movement of the second vehicle system occurring based on a comparison between: (a) the one or more of the characteristic of the first vehicle system, the characteristic of the one or more routes where the wheel slip occurred, or the characteristic of the weather condition in which the wheel slip occurred, and (b) the one or more of the characteristic of the second vehicle system, the characteristic of the one or more routes to be traveled by the second vehicle system, or the weather condition in which the second vehicle system is or will be traveling. The one or more processors are configured to direct controlling movement of the second vehicle system to prevent wheel slip from occurring at the predicted location.

In one embodiment, a method comprising determining one or more of a characteristic of a first vehicle system that experienced wheel slip at a location along one or more routes, a characteristic of the one or more routes where the wheel slip occurred, or a characteristic of a weather condition in which the wheel slip occurred during movement of the first vehicle system. The method also includes determining one or more of a characteristic of a second vehicle system, a characteristic of one or more routes to be traveled by the second vehicle system, or a weather condition in which the second vehicle system is or will be traveling. The method further includes determining a predicted location where wheel slip will occur for the second vehicle system absent a change to movement of the second vehicle system occurring based on a comparison between: (a) the one or more of the characteristic of the first vehicle system, the characteristic of the one or more routes where the wheel slip occurred, or the characteristic of the weather condition in which the wheel slip occurred, and (b) the one or more of the characteristic of the second vehicle system, the characteristic of the one or more routes to be traveled by the second vehicle system, or the weather condition in which the second vehicle system is or will be traveling. The method also includes controlling movement of the second vehicle system to prevent wheel slip from occurring at the predicted location.

BRIEF DESCRIPTION OF THE DRAWINGS

Reference is now made briefly to the accompanying drawings, in which.

DETAILED DESCRIPTION

One or more embodiments of the inventive subject matter described herein include systems and methods that predict (e.g., forecast or otherwise pre-determine) locations along one or more routes where wheel slip will or is likely to occur for a vehicle system traveling on the one or more routes. Detected instances of wheel slip experienced by vehicle systems that previously traveled over the one or more routes may be associated with the locations along the route where wheel slip was detected, and optionally may be associated with characteristics of the vehicle system, the route, and/or ambient conditions. The adhesion values may be quantifiable measures or calculations of adhesion between wheels of a vehicle system and the route.

The characteristics associated with the detected instances of wheel slip may be used to predict whether a vehicle system will experience wheel slip. Responsive to determining that a vehicle system will or is likely to experience wheel slip (e.g., more likely than not), one or more actions may be implemented to avoid or reduce the amount of wheel slip. As one example, power output and/or tractive effort generated by one or more propulsion-generating vehicles in the vehicle system may be reduced during travel over the location or locations associated with the increased probability of wheel slip. In one embodiment, the vehicle system may travel along one or more routes according to a trip plan that designates different operational settings of the vehicle system at different locations along the one or more routes, at different times during the trip, and/or at different distances along the one or more routes. These operational settings can be throttle settings, brake settings, speeds, tractive efforts generated by different motors, torques generated by the motors, accelerations, etc.

The vehicle systems described herein can be formed from a single vehicle or from two or more vehicles traveling together. With respect to two or more vehicles, the vehicles may be mechanically coupled with each other, such as by couplers, or may be separate from each other but communicate with each other so that the vehicles can coordinate the respective movements of the vehicles and travel together as a vehicle system. The vehicles may be rail vehicles (e.g., locomotives and/or rail cars), or other types of vehicles, such as automobiles, trucks, buses, mining vehicles, etc.

Wheel slip can be identified by a vehicle system traveling along a route using a rotational speed of one or more wheels of the vehicle system and a moving speed of the vehicle system. The rotational speed may be measured by one or more tachometers measuring how quickly the wheel(s) of the vehicle system are rotating, and the moving speed of the vehicle system may be measured by another, different sensor, such as a global positioning system receiver. A difference, or error, between the rotational speed and moving speed measured by these sensors can be referred to as a co-variance error between the sensor outputs. This co-variance error may be used to account for errors in the speed of the vehicle system. When wheel slip occurs, this speed error increases at a corresponding location along a route and then may decrease to a previous value. The decrease back to the previous value may indicate that the increased error in speed was due to wheel slip, which may be a temporary condition.

Once the location (or zone) along a route where wheel slip occurred is identified, a correlation between the wheel slip location and one or more characteristics of the vehicle system, the route, and/or ambient conditions is made. For example, the total weight, weight distribution, size (e.g., length), number of propulsion-generating vehicles, arrangement or relative positions of the propulsion-generating vehicles, etc., in the vehicle system may be associated with the wheel slip location. As another example, the grade and/or curvature of the route may be associated with the wheel slip location. Optionally, ambient conditions such as temperature, precipitation, humidity, etc., may be associated with the wheel slip location.

Many wheel slips may be identified for many different locations for different types of vehicles on different routes under different ambient conditions. The various combinations or sets of characteristics associated with each wheel slip location may be used to predict when other (e.g., future or upcoming) vehicle systems will or are likely to experience wheel slip. For example, a vehicle system (having similar characteristics as a previous vehicle system) traveling on a route where wheel slip occurred for the previous vehicle system (under similar ambient conditions as the vehicle system will be traveling under) may be predicted to experience wheel slip at the same location as the previous vehicle system.

In one embodiment, a trip plan or other precautionary plans may be created or modified in response to predicting one or more locations where wheel slip is likely to occur. These plans can involve directing an adhesion modifying device (e.g., a sand applicator, such as a blower that dispenses sand) to apply an adhesion modifying substance (e.g., sand) onto the route at the location where wheel slip is likely to occur prior to (or just prior to) the vehicle system traveling over the location. The plans can include reducing power output (e.g., torque applied to axles or wheels of the vehicle system by motors, tractive effort generated by the motors, etc.) at the location where wheel slip is predicted to occur.

Predicting locations where wheel slip is likely to occur and implementing actions to avoid wheel slip can provide for one or more technical effects of the inventive subject matter described herein. As one example, the amount of power generated by propulsion systems onboard the vehicles may be automatically limited to the power that can be handled by the interface between the wheels and the route surface (without causing wheel slip). This can reduce the amount of damage to the routes and/or wheels caused by wheel slip. Some vehicle systems may be automatically controlled to move along routes according to a trip plan. The automatic control of the vehicle systems may terminate, however, responsive to wheel slip occurring. By predicting where wheel slip is likely to occur and implementing actions to prevent wheel slip, the vehicle systems may be automatically controlled according to the plans for longer periods of time or distances along the routes. If the trip plans are created to reduce the amount of fuel consumed and/or emissions generated by the vehicle systems (e.g., relative to traveling at an upper speed limit or track speed of the route), then prolonging the time and/or distance that the vehicle systems can be automatically controlled according to the trip plans can improve the amount of fuel saved and/or the amount of emissions generated. With respect to vehicle systems that are otherwise automatically controlled (e.g., automatically controlled automobiles), predicting and preventing wheel slip can reduce losses of traction and thereby increase instances and duration of safe operation of the vehicle systems.

Figure 1:
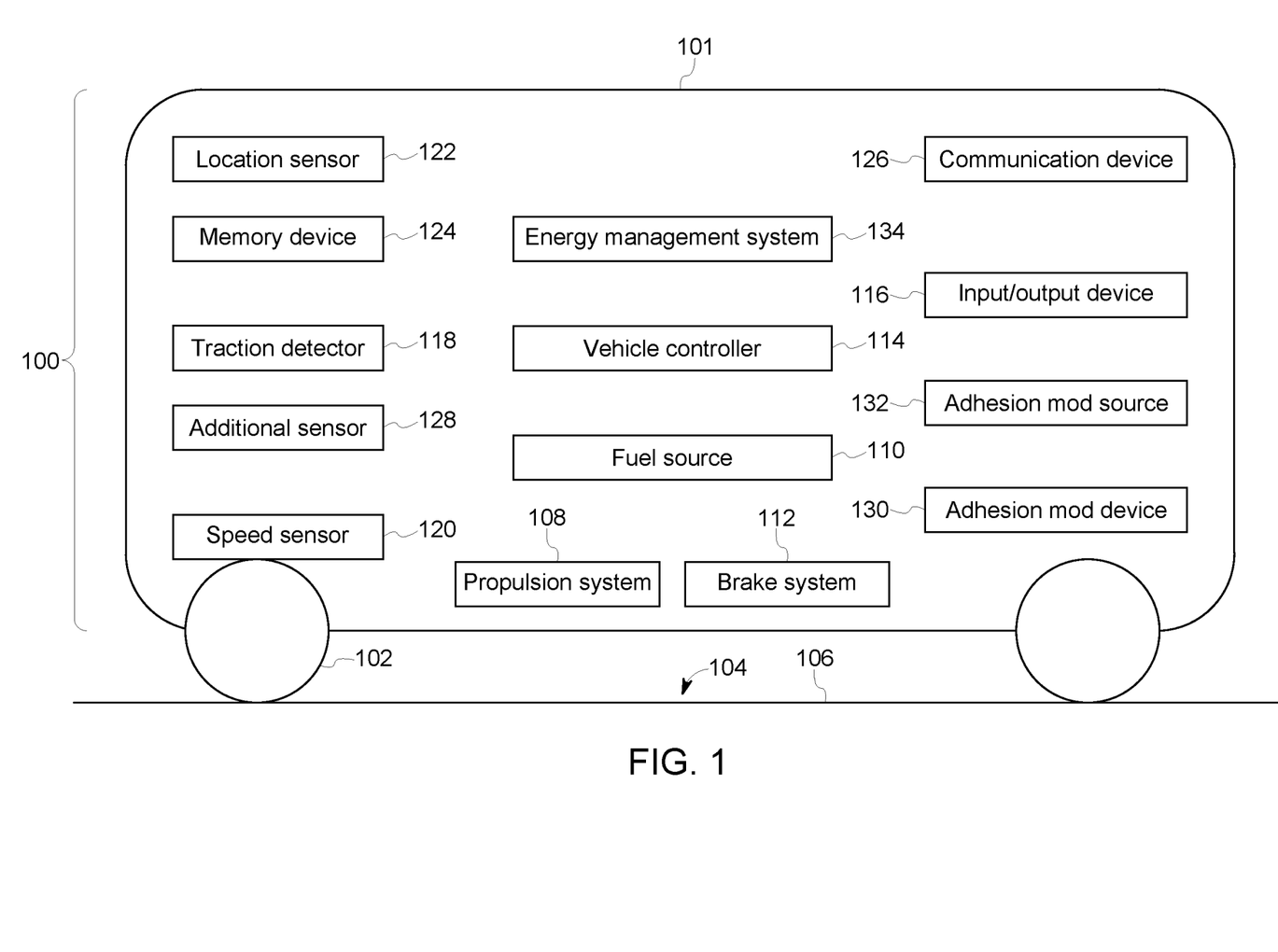
FIG. 1 illustrates one embodiment of a vehicle control system.

FIG. 1 illustrates one embodiment of a vehicle control system 100. The vehicle control system may operate to monitor movement of a vehicle system 101 and detect wheel slip between one or more wheels 102 of the vehicle system and a surface 104 of a route 106 being traveled upon by the vehicle system. The vehicle system may be shown or described as a rail vehicle, but optionally may represent another type of vehicle, as described above. Additionally, the vehicle system may be formed from one or more mechanically or logically coupled vehicles, also as described above.

The vehicle system is propelled by a propulsion system 108 that represents one or more engines, alternators, generators, traction motors, gear boxes (holding gears that translate rotary motion created by an engine or motor into rotary motion of the wheels and/or axles of the vehicle system). The propulsion system may be supplied with fuel from a fuel source 110, such as a tank of fuel, one or more batteries, or the like. The vehicle system includes a brake system 112 that slows or stops movement of the vehicle system. The brake system may represent air brakes, friction brakes, regenerative brakes (e.g., that include one or more of the traction motors of the propulsion system), or the like.

A vehicle controller 114 represents hardware circuitry that includes and/or is connected with one or more processors (e.g., one or more microprocessors, field programmable gate arrays, integrated circuits, or the like) that operate to control movement of the vehicle system. The vehicle controller may receive input from an operator via one or more input and/or output devices 116 ("Input/Output Device" in FIG. 1) and, based on the input, change the propulsive force or effort (e.g., torque, power output, tractive effort, etc.) generated by the propulsion system and/or change the braking force or effort generated by the braking system. The input and/or output devices can represent one or more touchscreens, display devices, keyboards, pedals, levers, switches, buttons, microphones, speakers, or the like, that receive information from an operator and/or provide information to the operator.

A traction detector 118 represents hardware circuitry that includes and/or is connected with one or more processors (e.g., one or more microprocessors, field programmable gate arrays, integrated circuits, or the like) that operate to detect wheel slip between one or more wheels of the vehicle system and the surface of the route being traveled upon. The traction detector may communicate with different sensors 120, 122 of the vehicle system to determine speeds measured by the sensors. One of these sensors 120 can include a rotary speed sensor that measures the speed at which one or more wheels of the vehicle system rotate. The rotary speed sensor can include a tachometer, for example. While only a single rotary speed sensor is shown in FIG. 1, the system may include more than one rotary speed sensor. Another sensor 122 can include a location sensor that determines locations of the vehicle system. For example, the location sensor can include a global positioning system (GPS) receiver, wireless transceiving equipment (that triangulates locations of the vehicle system), or the like. Based on data provided by location sensor, the speed at which the vehicle system moves along the route can be determined. For example, the GPS receiver can output a speed at which the receiver determines that the vehicle system is moving along the route.

The traction detector receives the speeds measured by the different sensors to detect wheel slip. Differences between the speeds measured by the different sensors can be indicative of wheel slip. For example, an increase in the speed measured by the rotary speed sensor without a corresponding (e.g., occurring at or over the same time period) increase in the moving speed measured by the location sensor, followed by a decrease in the speed measured by the rotary speed sensor without a corresponding decrease in the moving speed measured by the location sensor may indicate that wheel slip has occurred.

Figure 2:
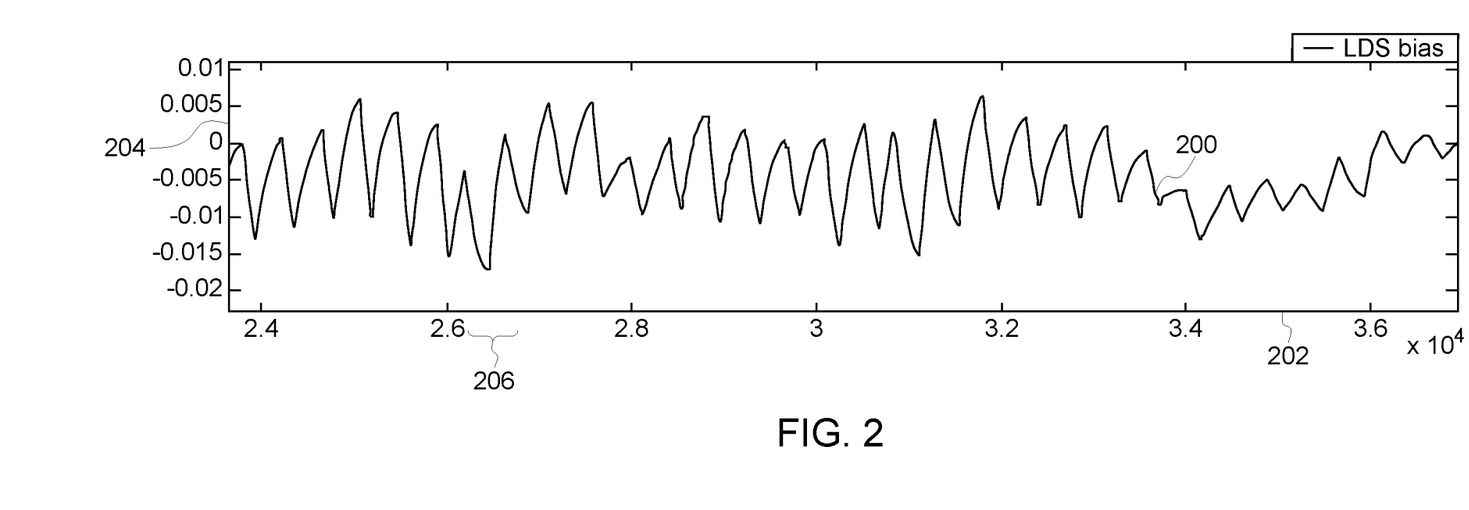
FIG. 2 illustrates co-variances between a moving speed of a vehicle system and a rotational speed of a wheel of the vehicle system with no wheel slip occurring.
Figure 3:
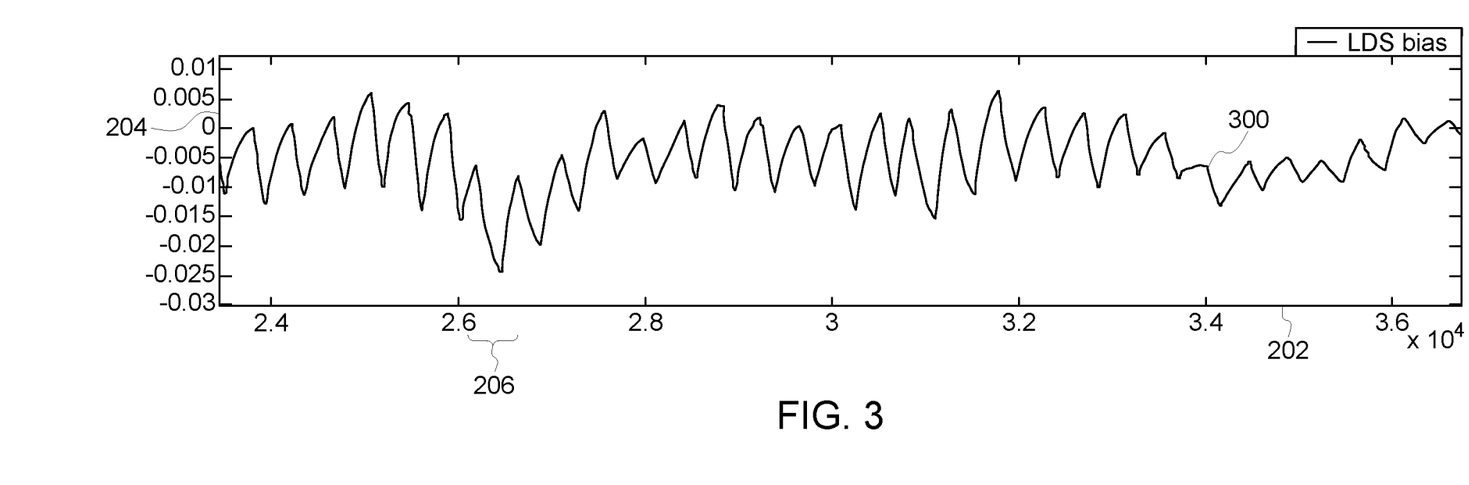
FIG. 3 illustrates co-variances between a moving speed of a vehicle system and a rotational speed of a wheel of the vehicle system with wheel slip occurring.

FIG. 2 illustrates co-variances 200 between the moving speed of the vehicle system shown in FIG. 1 along a route and the rotational speed of a wheel of the vehicle system with no wheel slip occurring. FIG. 3 illustrates co-variances 300 between the moving speed of the vehicle system shown in FIG. 1 along the route and the rotational speed of a wheel of the vehicle system with wheel slip occurring.

The co-variances in FIGS. 2 and 3 are shown alongside a horizontal axis 202 representative of locations or distances along the route and a vertical axis 204 representative of magnitudes of the co-variances. The co-variances indicate how closely the moving speed of the vehicle system along the route and the rotational speed of the wheel change together. Larger positive values of co-variance indicate that the moving and rotational speeds are changing together (thereby indicating no wheel slip) while smaller or more negative values indicate that these speeds are not changing together (e.g., one speed is changing while the other speed is not changing or is changing in an opposite direction).

As shown in FIGS. 2 and 3, the co-variance 300 decreases more than the co-variance 200 at a location 206 along the route (e.g., at or around $2.63 \times 10^4$ along the horizontal axis 202). The co-variance 300 decreases to a value of or about −0.025 at this location, while the co-variance 200 decreases to a value of or about −0.017. The smaller co-variance 300 at this location indicates that the rotational wheel speed changed (e.g., increased) by more than the moving speed, which can result or be caused by wheel slip. The traction detector shown in FIG. 1 may examine these speeds and/or co-variances, and determine that wheel slip occurred at the location along the route represented by $2.63 \times 10^4$ along the horizontal axis 202. The traction detector may identify one or more additional instances of wheel slip in a similar manner.

Returning to the description of the control system shown in FIG. 1, the location 206 at which the wheel slip was detected by the traction detector is saved onboard the vehicle system (e.g., on one or more memory devices 124 that include one or more computer hard drives, flash drives, optical disks, or the like) and/or is communicated to an off-board location via a communication device 126. The communication device represents transceiving circuitry and associated hardware (e.g., antennas, routers, modems, etc.) for communicating signals via wired and/or wireless connections. The communication device may wirelessly communicate with an off-board location, such as a dispatch facility, repair facility, other vehicle in the same vehicle system, other vehicle system, etc. The location where wheel slip occurred and data indicating that wheel slip occurred may be recorded (e.g., stored) on the memory device onboard the vehicle system and/or at the off-board location.

In one embodiment, one or more characteristics of the vehicle system, one or more characteristics of the route on which wheel slip was detected, and/or one or more characteristics of the ambient conditions in which the wheel slip was detected may be associated with (e.g., stored in a memory device) the location where wheel slip was detected. These characteristics may be input by an operator of the control system (e.g., via the input/output device), may be obtained from a database or other memory structure of data in the memory device (onboard and/or off-board the vehicle system), and/or from one or more additional sensors 128 (described below).

The one or more characteristics of the vehicle system can be referred to as vehicle characteristics or vehicle system characteristics, and can represent qualities of the vehicle system. The vehicle characteristics can include a size of the vehicle system, such as a length of the vehicle system or number of vehicles included in the vehicle system. Another vehicle characteristic can include an arrangement or distribution of vehicles in a vehicle system formed from two or more vehicles. For example, the spacing or relative locations of propulsion-generating vehicle(s) and/or non-propulsion-generating vehicle(s) in the vehicle system may be a vehicle characteristic. Another vehicle characteristic can include an arrangement or distribution of weight in the vehicle system. For example, the weight of the vehicle system at different locations along the length of the vehicle system may be another vehicle characteristic. Another vehicle characteristic can include the total weight of the vehicle system (instead of or in addition to the arrangement or distribution of weight along the length of the vehicle system, as described above). Another vehicle characteristic can include a power-to-weight ratio, such as a number representing the power that the vehicle can generate divided by the weight of the vehicle.

The one or more characteristics of the route can be referred to as route characteristics, and can represent qualities of the route at the location where wheel slip was detected. The route characteristics can include the location where wheel slip was detected (e.g., as determined by the location sensor). Optionally, the route characteristics can include a grade and/or curvature of the route where wheel slip was detected (e.g., as determined by one or more accelerometers as the additional sensor onboard the vehicle system). Another route characteristic can represent the terrain of the route, such as desert, urban area, rural, etc.

The one or more characteristics of ambient conditions can be referred to as weather characteristics or ambient condition characteristics, and can represent the ambient conditions under which a vehicle system experienced wheel slip at the location. The weather characteristics can include an amount and/or type of precipitation where wheel slip was detected, a temperature of the environment where wheel slip was detected, a humidity of the environment where wheel slip was detected, other weather conditions of the environment where wheel slip was detected (e.g., wind speed, currently raining or snowing, etc.), travel restrictions (e.g., a flood warning indicating that the area may be experiencing or is about to experience flooding), the time of the year (e.g., season), etc. The traction detector can obtain some or all of the weather characteristics from an off-board source, such as a server storing weather conditions, and/or from the additional sensor(s) (which can represent humidity sensors, thermometers, rain gauges, etc.).

The traction detector may associate one or more of the vehicle system, route, and/or weather characteristics with the location where wheel slip was detected. This association may be performed by storing data indicative of the wheel slip, the wheel slip location, the vehicle system characteristics, the route characteristics, and/or the weather characteristics together in the onboard or off-board memory device. This association may be used to predict where wheel slip will occur for other vehicle systems, as described below.

Figure 4:
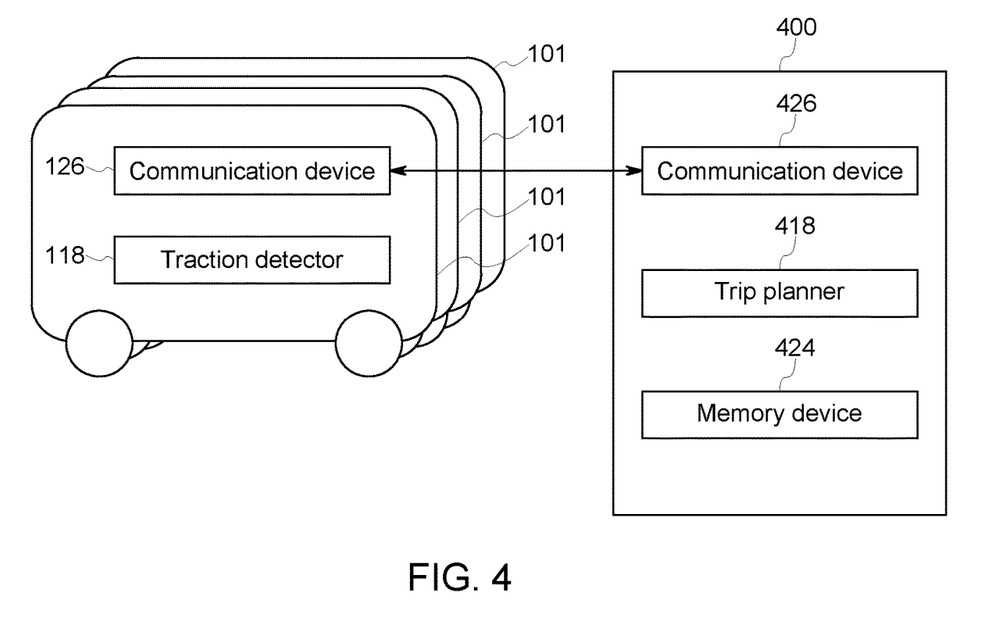
FIG. 4 illustrates one embodiment of an off-board vehicle control system.

FIG. 4 illustrates one embodiment of an off-board vehicle control system 400. While the control system shown in FIG. 1 is disposed onboard the vehicle system (and may be referred to as an onboard vehicle control system), one or more components of the vehicle control system 400 are disposed off-board the vehicle system.

The control system 400 includes a communication device 426 that may be similar or identical to the communication device shown in FIG. 1 to allow the control system 400 to communicate with several vehicle systems, as shown in FIG. 4. The traction detectors disposed onboard the different vehicle systems can report the locations of wheel slip detections to a trip planner 418 of the off-board control system via the communication devices. The trip planner represents hardware circuitry that includes and/or is connected with one or more processors (e.g., one or more microprocessors, field programmable gate arrays, integrated circuits, or the like) that operate to predict where wheel slips will or are likely to occur for upcoming movement of one or more vehicle systems. The locations of wheel slips may be stored in a memory device 424, along with the vehicle characteristics, route characteristics, and/or weather characteristics associated with the wheel slips. The memory device 424 may be identical or similar to the memory device onboard the vehicle system.

In operation, the trip planner receives one or more vehicle characteristics of a vehicle system preparing to travel over an upcoming segment of a route, one or more route characteristics of the upcoming segment of the route, and/or one or more weather characteristics. The vehicle system may be scheduled to travel over the route segment at a future time and/or is moving toward the route segment, but has not yet traveled over the locations where wheel slips previously were detected by the same or other vehicle systems. The trip planner compares the vehicle characteristics, route characteristics, and/or weather characteristics associated with the vehicle system and the upcoming travel of the vehicle system to one or more different sets of vehicle characteristics, route characteristics, and/or weather characteristics associated with previously detected locations of wheel slip. The previously detected locations of wheel slip may be detected by the traction detector disposed onboard the same or a different vehicle system than the vehicle system preparing to travel over the upcoming segment of the route.

The vehicle characteristic(s), the route characteristic(s), and/or the weather characteristic(s) associated with the upcoming movement of the vehicle system along one or more routes are compared by the trip planner with corresponding characteristics associated with locations along the one or more routes where wheel slips were previously detected. Different locations of detected wheel slip may be associated with different sets of vehicle characteristics, route characteristics, and/or weather characteristics. The comparison can be made to determine which, if any, of the wheel slip locations are associated with characteristics (e.g., vehicle, route, and/or weather characteristics) that are the same as or similar to the characteristic(s) associated with the vehicle system about to travel over the upcoming segment of the route.

If one or more locations of previous wheel slip detections are on the route to be traveled by the vehicle system and have characteristics (e.g., vehicle, route, and/or weather characteristics) that are the same as or similar to the characteristic(s) associated with vehicle system, then these locations may be identified by the trip planner as locations where wheel slip is likely to occur or will occur. The characteristics may be the same when the characteristics have the same value (e.g., the same vehicle system weight, the same location along the route, the same make or model of the vehicles, etc.). The characteristics may be similar when the characteristics do not have the same value, but have values that are relatively close to each other (e.g., the vehicle system weights are different but within 10% of each other, etc.).

Optionally, the locations where wheel slip previously was detected need not be the same locations where wheel slip is predicted for a vehicle system. For example, wheel slip may be predicted to occur at a location along a route having the same or similar grade, having same or similar curvature, and/or manufactured from the same or similar material as a location where wheel slip was previously detected.

The trip planner can implement one or more responsive actions upon or responsive to determining that the vehicle system is likely to encounter wheel slip along one or more locations on an upcoming segment of the route. As one example, the trip planner can create a trip plan or change designated operational settings of a trip plan for the vehicle system to avoid experiencing wheel slip. As another example, the trip planner can direct an adhesion modifying device 130 ("Adhesion Mod Device" in FIG. 1) onboard the vehicle system (or another vehicle system traveling ahead of the vehicle system) to apply an adhesion modifying material from an adhesion modifying source 132 ("Adhesion Mod Source" in FIG. 1) onboard the vehicle system. This material may be sand, air, or the like, that is dispensed onto the surface of the route by the adhesion modifying device 130 (e.g., a pump or other dispenser) from a tank or other container (e.g., the source 132), or from an air compressor (e.g., the source 132). As another example, the trip planner can establish upper limits on movement of the vehicle system at the locations associated with the increased probability of wheel slip. Alternatively, the traction detector onboard the vehicle system may perform the comparison described above to identify the locations where wheel slip is likely to occur, and optionally may implement the one or more responsive actions.

With respect to the responsive action of creating or changing a trip plan, the trip plan may designate different operational settings at different locations along one or more routes, different times during a trip, and/or different distances along the one or more routes, as described above. The trip plan may be created and/or modified off the vehicle system by the trip planner. Optionally, the trip plan may be created and/or modified onboard the vehicle system by an energy management system 134 onboard the vehicle system. The energy management system represents hardware circuitry that includes and/or is connected with one or more processors (e.g., one or more microprocessors, field programmable gate arrays, integrated circuits, or the like) that create and/or modify trip plans. The energy management system may examine previous trips of the same or other vehicle systems, the vehicle characteristics, the route characteristics, and/or other characteristics to determine the operational settings of the vehicle system at different locations along one or more routes, at different distances along the one or more routes, and/or at different times for a trip that reduce fuel consumption and/or emission generation (e.g., relative to the vehicle system traveling on the one or more routes for the trip at an upper speed limit or track speed). The trip plan may be communicated to the vehicle controller (from the trip planner and/or energy management system), and the vehicle controller may automatically generate and communicate control signals to the propulsion system and/or brake system. These control signals may automatically control movement of the vehicle system to follow the operational settings of the trip plan. Optionally, the control signals may be communicated to the operator (e.g., via the input/output device) to instruct the operator how to control the movement of the vehicle system according to the trip plan.

But, based on the characteristics of the vehicle system, route, and/or weather, the vehicle system may be likely to experience wheel slip at various locations, as described above. To prevent the predicted wheel slips from occurring (or reduce the number of wheel slips that do occur), the trip plan may be created or modified by the trip planner and/or energy management system to avoid the wheel slips. This may be accomplished by an inter-vehicle distribution or re-distribution of the tractive efforts generated by propulsion-generating vehicles in the vehicle system. An inter-vehicle distribution of tractive efforts involves setting or changing what tractive efforts are generated by different vehicles in a vehicle consist to prevent wheel slip from occurring.

Figure 5:
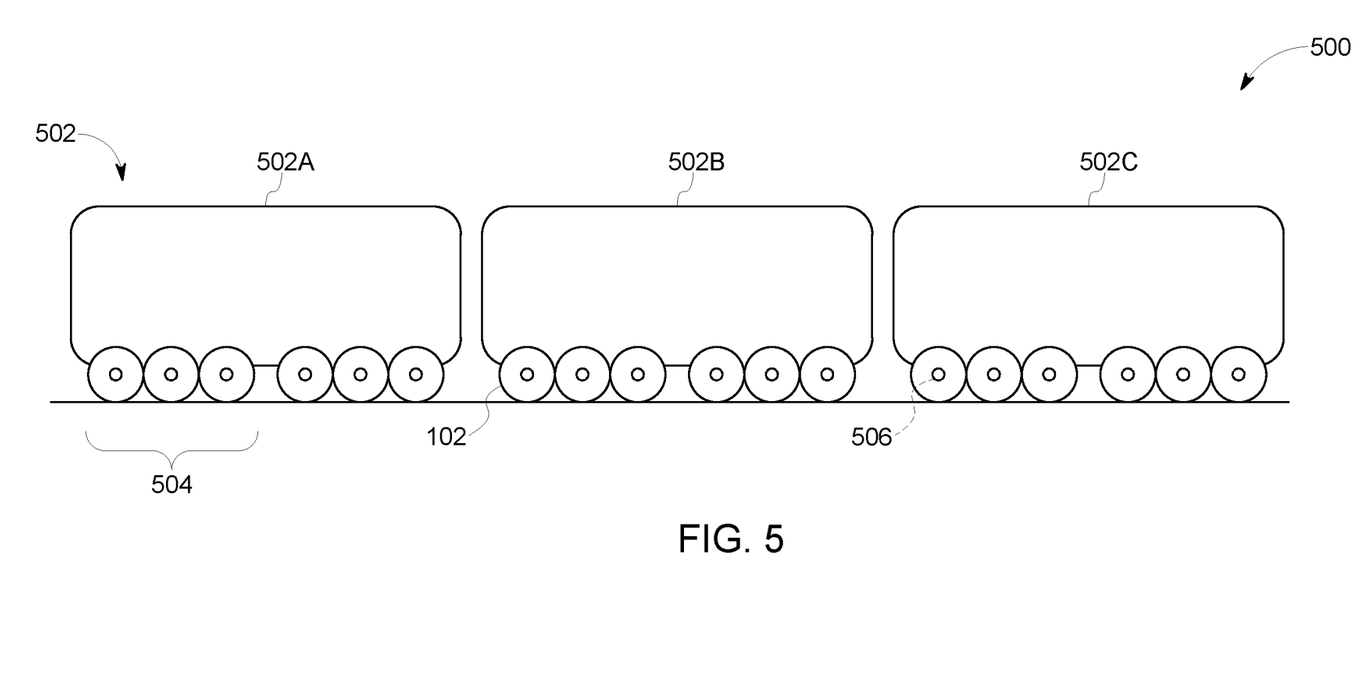
FIG. 5 illustrates one example of a vehicle consist or vehicle system.

FIG. 5 illustrates one example of a vehicle consist or vehicle system 500. The vehicle consist is formed by three vehicles 502 (e.g., vehicles 502A-C) in FIG. 5, but optionally can be formed from a different number of at least two or more vehicles. Each of the vehicles 502 includes the propulsion system described above, and can generate tractive effort to propel the vehicles 502. The vehicles 502 may be mechanically or logically coupled with each other, also as described above. In one embodiment, at least one of the vehicles 502 shown in FIG. 5 represents the vehicle system 101 shown in FIG. 1.

The vehicles 502 each include bogies or trucks 504 that have sets of wheels and associated axles 506 connected with the wheels. The axles may be independently rotated by different motors of the propulsion system. The tractive efforts to be generated by the different vehicles during a trip can be established in a trip plan or modified in a trip plan to reduce the probability of predicted wheel slips occurring. The trip planner or energy management system may reduce the probability of a predicted wheel slip occurring at a location along a route by reducing the tractive effort generated by the propulsion system of one or more leading vehicles in the vehicle consist.

The leading vehicle(s) are vehicles that are ahead of one or more other vehicles in the vehicle consist along a direction of travel. If the vehicles shown in FIG. 5 are moving in a left-to-right direction, then the vehicle 502C is a leading vehicle to the vehicles 502A, 502B, and the vehicle 502B is a leading vehicle to the vehicle 502A (but not to the vehicle 502C). The trip plan may be created or modified such that the tractive effort generated by the vehicle 502C according to the designated operational settings of the trip plan is reduced relative to the tractive efforts generated by the vehicle 502A and/or 502B according to the designated operational settings of the trip plan. Reducing the tractive effort generated by a leading vehicle may reduce the probability that wheel slip occurs at the predicted location of wheel slip.

Figure 6:
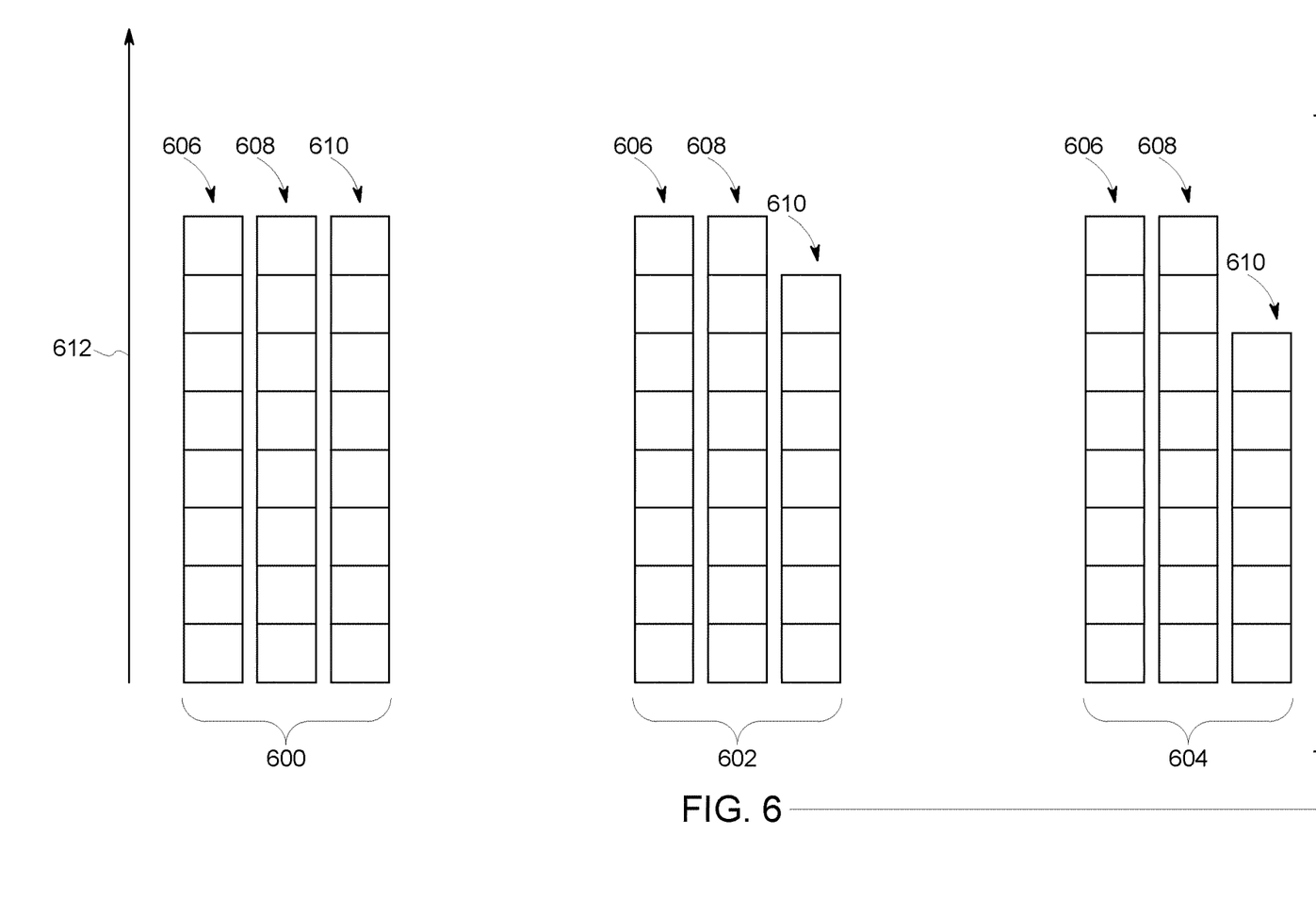
FIG. 6 illustrates different sets of designated operational settings of the vehicles shown in FIG. 5 according to different examples.

FIG. 6 illustrates different sets 600, 602, 604 of designated operational settings 606, 608, 610 of the vehicles shown in FIG. 5 according to different examples. The operational settings are shown alongside a vertical axis 612 indicative of different magnitudes of the operational settings. The operational settings may represent throttle settings, torques, tractive efforts, or the like, designated by different trip plans. The operational settings 606 may indicate the operational settings designated for the vehicle 502A, the operational settings 608 may indicate the operational settings designated for the vehicle 502B, and the operational settings 610 may indicate the operational settings designated for the vehicle 502C.

An initial trip plan may designate the first set 600 of operational settings for a location associated with a predicted wheel slip for the vehicle system. As shown in FIG. 6, the operational settings may be the same for all vehicles at this location. But, because the vehicle system is likely to experience wheel slip at this location, the trip planner and/or energy management system may change one or more of the operational settings.

The operational settings of one or more leading vehicles may be reduced to decrease the tractive effort generated by the one or more leading vehicles. Reducing the tractive effort produced by the first vehicle to encounter a location of probable wheel slip can decrease the probability of the vehicles experiencing wheel slip relative to reducing the tractive effort of another vehicle in the vehicle system. The trip planner and/or energy management system may reduce the designated operational setting 604 of the vehicle 502C in a modified trip plan as shown in either set 602, 604 in order to reduce the likelihood that any of the vehicles 502 experience wheel slip at this location. Optionally, the operational setting of one or more trailing vehicles in the vehicle consist may be increased to make up for the decrease in operational setting of the leading vehicle.

Alternatively, the trip planner, energy management system, and/or vehicle controller may impose limits on the operational settings of the vehicles at a location associated with a predicted wheel slip. Instead of designating the operational settings of the vehicles, the trip planner, energy management system, and/or vehicle controller may impose limits by preventing the leading vehicle 502C from increasing the operational setting above the limit. The limit may be established at a level that is less than the limits or operational settings of the trailing vehicles in the vehicle consist so that the leading vehicle is restricted to producing less tractive effort than the trailing vehicles. This also can prevent wheel slip at the location.

Optionally, the vehicle controller, energy management system, and/or trip planner may direct the propulsion systems (e.g., by communicating control signals and/or by creating or revising a trip plan) of multiple or all vehicles in a vehicle system to reduce tractive effort during travel over a location associated with a predicted wheel slip. For example, instead of having only the leading vehicle 502C reduce tractive effort, all of the vehicles 502A-C may reduce the tractive efforts produced by the propulsion systems (relative to locations prior to the location of predicted wheel slip) during travel over the location of the predicted wheel slip.

Figure 7:
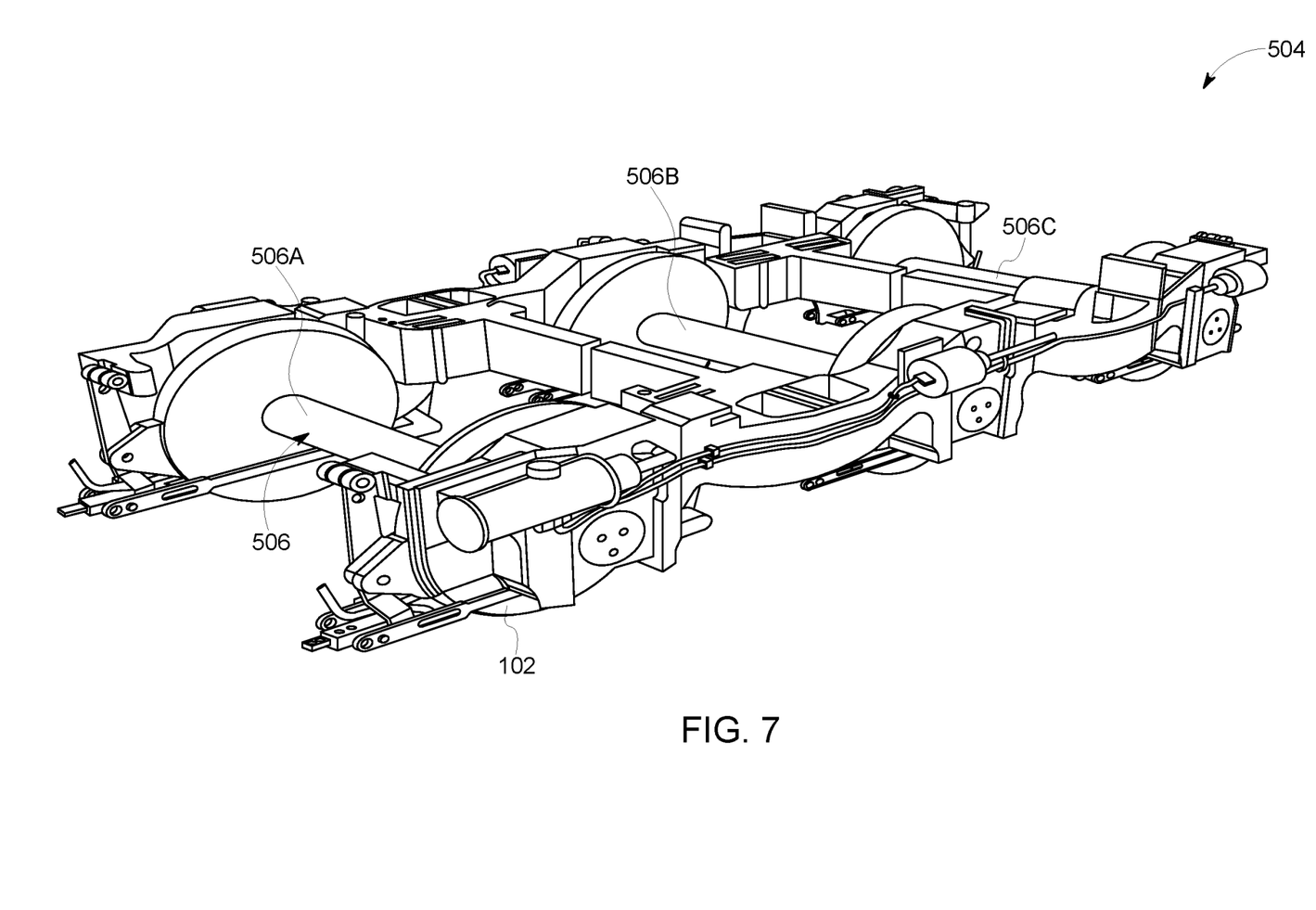
FIG. 7 illustrates one embodiment of a bogie of a vehicle shown in FIG. 5.

FIG. 7 illustrates one embodiment of a bogie 504 of a vehicle 502 shown in FIG. 5. As described above, each bogie may have several wheels 102 connected with axles 506 (e.g., axles 506A-C). Each axle may be rotated by a separate traction motor of the propulsion system. The trip planner and/or energy management system may create or modify a trip plan, or the vehicle controller can control the propulsion system, such that the tractive effort generated by the different motors via the separate axles and wheels changes or is re-distributed during movement over a location of predicted wheel slip.

The tractive efforts generated via the axles and wheels may be distributed within the bogie or same vehicle (e.g., intra-bogie or intra-vehicle re-distribution of tractive effort) so that the axle that first passes over the location of the predicted wheel slip reduces tractive effort relative to the trailing axle(s), and the tractive effort generated via the trailing axle(s) gradually increases. For example if the vehicle is moving in a direction that results in the axle 506C first passing over the predicted wheel slip location, then the axle 506B and then the axle 506A, then the trip plan may be modified or created, or the vehicle controller may control the propulsion system, to reduce the tractive effort generated by the propulsion system through the leading axle 506C while the axle 506C is moving over the location (e.g., relative to the tractive effort generated prior to this location), and then either not decrease the tractive efforts generated by the axles 506B, 506A, or reduce the tractive effort generated by the axle 506B by an amount less than the reduction in the tractive effort of the axle 506C, and then not reduce the tractive effort generated via the axle 506A.

For example, prior to reaching the predicted wheel slip location, the same tractive effort may be imparted by the motors onto the surface of the route by all three axles. At or just prior to reaching the location, the tractive effort of the leading axle (e.g., the axle 506C) may be reduced by a first amount (e.g., by 30%), the tractive effort of the first trailing axle (e.g., the axle 506B) may be reduced by a smaller, second amount (e.g., by 10%), and the tractive effort of the second trailing axle (e.g., the axle 506A) may not be reduced or may be reduced by a smaller amount. Alternatively, the tractive effort of only the leading axle may be reduced. The tractive efforts generated via the axles may return to the efforts generated just prior to reaching the location after the bogie has completed travel over the location.

FIG. 6 illustrates different sets 600, 602, 604 of designated operational settings 606, 608, 610 of the vehicles shown in FIG. 5 according to different examples. The operational settings are shown alongside a vertical axis 612 indicative of different magnitudes of the operational settings. The operational settings may represent throttle settings, torques, tractive efforts, or the like, designated by different trip plans. The operational settings 606 may indicate the operational settings designated for the vehicle 502A, the operational settings 608 may indicate the operational settings designated for the vehicle 502B, and the operational settings 610 may indicate the operational settings designated for the vehicle 502C.

An initial trip plan may designate the first set 600 of operational settings for a location associated with a predicted wheel slip for the vehicle system. As shown in FIG. 6, the operational settings may be the same for all vehicles at this location. But, because the vehicle system is likely to experience wheel slip at this location, the trip planner and/or energy management system may change one or more of the operational settings.

The operational settings of one or more leading vehicles may be reduced to decrease the tractive effort generated by the one or more leading vehicles. Reducing the tractive effort produced by the first vehicle to encounter a location of probable wheel slip can decrease the probability of the vehicles experiencing wheel slip relative to reducing the tractive effort of another vehicle in the vehicle system. The trip planner and/or energy management system may reduce the designated operational setting 604 of the vehicle 502C in a modified trip plan as shown in either set 602, 604 in order to reduce the likelihood that any of the vehicles 502 experience wheel slip at this location. Optionally, the operational setting of one or more trailing vehicles in the vehicle consist may be increased to make up for the decrease in operational setting of the leading vehicle.

Alternatively, the trip planner, energy management system, and/or vehicle controller may impose limits on the operational settings of the vehicles at a location associated with a predicted wheel slip. Instead of designating the operational settings of the vehicles, the trip planner, energy management system, and/or vehicle controller may impose limits by preventing the leading vehicle 502C from increasing the operational setting above the limit. The limit may be established at a level that is less than the limits or operational settings of the trailing vehicles in the vehicle consist so that the leading vehicle is restricted to producing less tractive effort than the trailing vehicles. This also can prevent wheel slip at the location.

Optionally, the vehicle controller, energy management system, and/or trip planner may direct the propulsion systems (e.g., by communicating control signals and/or by creating or revising a trip plan) of multiple or all vehicles in a vehicle system to reduce tractive effort during travel over a location associated with a predicted wheel slip. For example, instead of having only the leading vehicle 502C reduce tractive effort, all of the vehicles 502A-C may reduce the tractive efforts produced by the propulsion systems (relative to locations prior to the location of predicted wheel slip) during travel over the location of the predicted wheel slip.

As another example, the vehicle controller, energy management system, and/or trip planner may direct the adhesion modifying device of one or more of the vehicles to apply the adhesion modifying material to the location of the route of the predicted wheel slip. The adhesion modifying device may be directed to automatically dispense the air, sand, or other adhesion modifying material onto the route at and/or ahead of the location of the predicted wheel slip. This material may increase the coefficient of friction or adhesion between the wheels and the route at this location, and/or may clean the route by removing other material that may reduce the coefficient of friction or adhesion between the wheels and the route. As a result, the likelihood of experiencing wheel slip at this location is reduced or eliminated.

The trip planner and/or energy management system can take the amount of adhesion modifying material available to the adhesion modifying device into account when creating or modifying the trip plan. For example, the amount of adhesion modifying material stored in the source 132 shown in FIG. 1 may be provided to the trip planner and/or energy management system (e.g., by a sensor or operator). The trip planner and/or energy management system may create or modify the trip plan so that the locations associated with predicted wheel slips are given priority for application of the adhesion modifying material over other locations. As one example, if there are five locations having higher probabilities of wheel slip along routes of an upcoming trip, then the trip plan may be created or modified to ensure that the adhesion modifying material is automatically applied prior to or at these locations, and that the adhesion modifying device is prevented from applying the material in other locations (and potentially risking not having the material at the locations of predicted wheel slips).

The trip planner and/or energy management system can take the health of the propulsion systems of the vehicles into account when creating or modifying the trip plan. For example, some vehicles may have older or more worn down drive trains than other vehicles. The trip planner and/or energy management system may create or modify the trip plan so that the healthier propulsion systems of the vehicles (individually or collectively) generate more tractive effort than the less healthy propulsion systems of other vehicles (individually or collectively) at the location(s) where wheel slip is predicted to occur. The health of the propulsion systems may be obtained by the trip planner and/or energy management system from the memory devices and/or the operator.

The trip planner and/or energy management system can take historical performance of the vehicle systems in avoiding wheel slip into account when creating or modifying the trip plan. For example, during previous trips of one or more of the vehicles where wheel slip was predicted to occur and still did occur, the trip planner and/or energy management system can examine the tractive efforts or operational settings of those vehicles during the prior trip. The trip planner and/or energy management system may create or modify the trip plan to avoid using the same operational settings or combination of operational settings that resulted in wheel slip previously occurring. The operational settings and the detected wheel slips of the previous trips may be stored in and accessible from one or more of the memory devices or from an operator.

Figure 8:
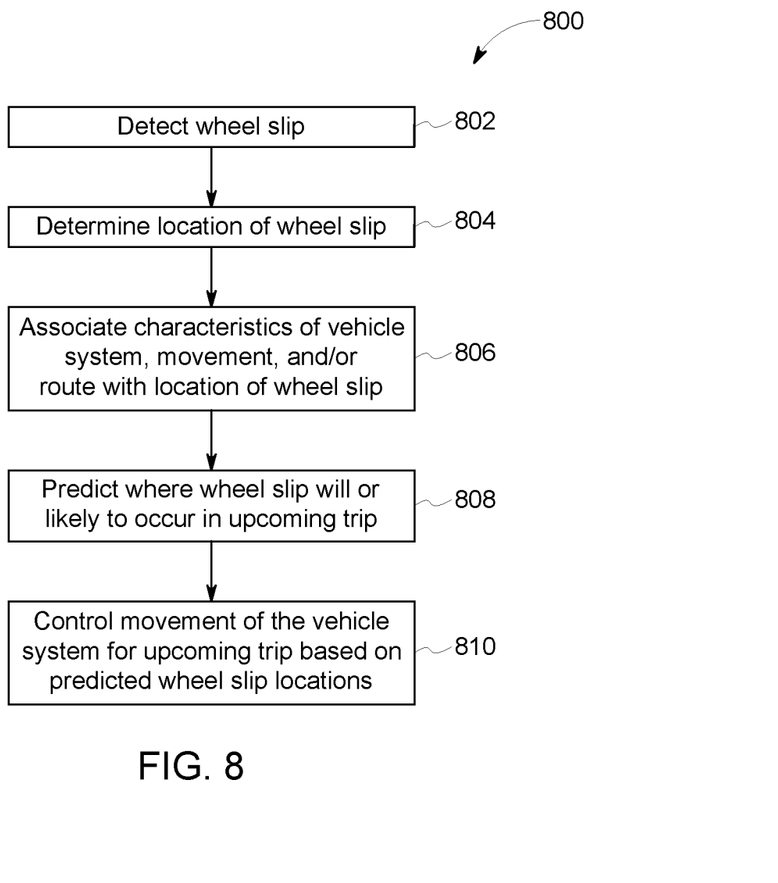
FIG. 8 illustrates a flowchart of one embodiment of a method for predicting wheel slip locations and/or controlling movement of a vehicle system to avoid or reduce predicted wheel slips.

FIG. 8 illustrates a flowchart of one embodiment of a method 800 for predicting wheel slip locations and/or controlling movement of a vehicle system to avoid or reduce predicted wheel slips. The method 800 may be performed by one or more embodiments of the control systems 100, 400, as described above. The method 800 can represent operations performed by one or more of these control systems as directed by one or more software applications, or can be used as an algorithm for creating such a software application.

At 802, wheel slip is detected during movement of a vehicle system along a route. The wheel slip may be identified responsive to measuring a temporary difference between a speed at which a wheel rotates and a speed at which the vehicle system moves along the route, as described above. At 804, a location of the wheel slip is determined. This location may be determined by obtaining the geographic location of the vehicle system at the time that wheel slip is detected from the location sensor described above.

At 806, characteristics of the vehicle system, route, and/or weather conditions are associated with the wheel slip locations. These characteristics can be associated with the wheel slip location by storing the characteristics with the wheel slip location in a database or other memory structure. At 808, wheel slip is predicted to occur at one or more locations along one or more routes for an upcoming trip of the same or different vehicle system. The characteristics of the vehicle system may be compared to the characteristics of the vehicle system that previously detected wheel slip, the characteristics of the route to be traveled upon may be compared to the characteristics of the route where wheel slip previously was detected, and/or the characteristics of the weather conditions in which the vehicle system is going to travel can be compared to the characteristics of the weather conditions in which the wheel slip previously was detected. If the characteristics of the upcoming travel are the same as or similar to the characteristics of one or more locations of previously detected wheel slip, then the vehicle system may be predicted to experience wheel slip at one or more locations on the upcoming trip.

At 810, movement of the vehicle system is controlled for the upcoming trip to avoid or prevent wheel slip at the predicted wheel slip locations. As described above, this can involve distributing tractive effort or torque among vehicle and/or axles such that the leading vehicle or axle reduced tractive effort or torque more than the other vehicles or axles during travel over the predicted wheel slip location. Optionally, this can involve applying an adhesion modifying material to the route or determining how to otherwise conserve or use the material during travel (so that there is some material to apply) at the predicted wheel slip location.

In one embodiment, a control system includes one or more processors configured to determine one or more predicted locations of wheel slip for an upcoming trip of a vehicle system by comparing one or more vehicle characteristics, route characteristics, or weather characteristics associated with the upcoming trip of the vehicle system with one or more vehicle characteristics, route characteristics, or weather characteristics associated with one or more previous detections of wheel slip. The one or more processors are configured to control movement of the vehicle system during the upcoming trip by one or more of reducing tractive effort generated by a leading vehicle of the vehicle system relative to a trailing vehicle of the vehicle system during movement over the one or more predicted locations, reducing tractive effort generated by a leading axle in a vehicle of the vehicle system relative to a trailing axle of the vehicle during movement over the one or more predicted locations, or directing an adhesion modifying device to automatically dispense an adhesion modifying substance onto the one or more predicted locations.

Optionally, the vehicle characteristic associated with the upcoming trip and the vehicle characteristic associated with the one or more previous detections of wheel slip respectively include one or more of a total weight of the vehicle system, a weight distribution of the vehicle system, a size of the vehicle system, a number of propulsion-generating vehicles in the vehicle system, an arrangement of the propulsion-generating vehicles in the vehicle system, or a power-to-weight ratio of the vehicle system.

Optionally, the route characteristic associated with the upcoming trip and the route characteristic associated with the one or more previous detections of wheel slip respectively include one or more of a curvature or a curvature of one or more routes Optionally, the weather characteristic associated with the upcoming trip and the weather characteristic associated with the one or more previous detections of wheel slip respectively include one or more of an amount of precipitation, a type of the precipitation, a temperature, or a humidity.

In one embodiment, a control system includes one or more processors configured to determine one or more of a characteristic of a first vehicle system that experienced wheel slip at a location along one or more routes, a characteristic of the one or more routes where the wheel slip occurred, or a characteristic of a weather condition in which the wheel slip occurred during movement of the first vehicle system, the one or more processors also configured to determine one or more of a characteristic of a second vehicle system, a characteristic of one or more routes to be traveled by the second vehicle system, or a weather condition in which the second vehicle system is or will be traveling. The one or more processors are configured to determine a predicted location where wheel slip will occur for the second vehicle system absent a change to movement of the second vehicle system occurring based on a comparison between: (a) the one or more of the characteristic of the first vehicle system, the characteristic of the one or more routes where the wheel slip occurred, or the characteristic of the weather condition in which the wheel slip occurred, and (b) the one or more of the characteristic of the second vehicle system, the characteristic of the one or more routes to be traveled by the second vehicle system, or the weather condition in which the second vehicle system is or will be traveling. The one or more processors are configured to direct controlling movement of the second vehicle system to prevent wheel slip from occurring at the predicted location.

Optionally, the characteristic of the first vehicle system includes one or more of a total weight of the first vehicle system, a weight distribution of the first vehicle system, a size of the first vehicle system, a number of propulsion-generating vehicles in the first vehicle system, an arrangement of the propulsion-generating vehicles in the first vehicle system, or a power-to-weight ratio of the first vehicle system.

Optionally, the characteristic of the second vehicle system includes one or more of a total weight of the second vehicle system, a weight distribution of the second vehicle system, a size of the second vehicle system, a number of propulsion-generating vehicles in the second vehicle system, an arrangement of the propulsion-generating vehicles in the second vehicle system, or a power-to-weight ratio of the second vehicle system.

Optionally, the characteristic of the one or more routes where the wheel slip occurred includes one or more of a curvature of the one or more routes where the wheel slip occurred or a grade of the one or more routes where the wheel slip occurred.

Optionally, the characteristic of the one or more routes to be traveled by the second vehicle system includes one or more of a curvature of the one or more routes to be traveled by the second vehicle system or a grade of the one or more routes to be traveled by the second vehicle system.

Optionally, the characteristic of the weather condition in which the wheel slip occurred includes one or more of an amount of precipitation where the wheel slip occurred, a type of the precipitation where the wheel slip occurred, a temperature of an environment where the wheel slip occurred, or a humidity of the environment where the wheel slip occurred.

Optionally, the characteristic of the weather condition in which the second vehicle system is to travel includes one or more of an amount of precipitation, a type of the precipitation, a temperature of an environment, or a humidity.

Optionally, the one or more processors are configured to direct controlling the movement of the second vehicle system to prevent wheel slip from occurring at the predicted location by directing a leading propulsion-generating vehicle in the second vehicle system to reduce tractive effort relative to a tractive effort generated by a trailing propulsion-generating vehicle in the second vehicle system during travel of the second vehicle system over the predicted location of wheel slip.

Optionally, the one or more processors are configured to direct controlling movement of the second vehicle system to prevent wheel slip from occurring at the predicted location by directing a propulsion system to reduce a tractive effort generated via a leading axle in a propulsion-generating vehicle in the second vehicle system relative to a tractive effort generated by a trailing axle in the propulsion-generating vehicle in the second vehicle system during travel of the second vehicle system over the predicted location of wheel slip.

Optionally, the one or more processors are configured to direct controlling movement of the second vehicle system to prevent wheel slip from occurring at the predicted location by directing an adhesion modifying device onboard the second vehicle system to automatically apply an adhesion modifying substance onto the predicted location of wheel slip.

In one embodiment, a method comprising determining one or more of a characteristic of a first vehicle system that experienced wheel slip at a location along one or more routes, a characteristic of the one or more routes where the wheel slip occurred, or a characteristic of a weather condition in which the wheel slip occurred during movement of the first vehicle system. The method also includes determining one or more of a characteristic of a second vehicle system, a characteristic of one or more routes to be traveled by the second vehicle system, or a weather condition in which the second vehicle system is or will be traveling. The method further includes determining a predicted location where wheel slip will occur for the second vehicle system absent a change to movement of the second vehicle system occurring based on a comparison between: (a) the one or more of the characteristic of the first vehicle system, the characteristic of the one or more routes where the wheel slip occurred, or the characteristic of the weather condition in which the wheel slip occurred, and (b) the one or more of the characteristic of the second vehicle system, the characteristic of the one or more routes to be traveled by the second vehicle system, or the weather condition in which the second vehicle system is or will be traveling. The method also includes controlling movement of the second vehicle system to prevent wheel slip from occurring at the predicted location.

Optionally, the characteristic of the first vehicle system includes one or more of a total weight of the first vehicle system, a weight distribution of the first vehicle system, a size of the first vehicle system, a number of propulsion-generating vehicles in the first vehicle system, an arrangement of the propulsion-generating vehicles in the first vehicle system, or a power-to-weight ratio of the first vehicle system.

Optionally, the characteristic of the second vehicle system includes one or more of a total weight of the second vehicle system, a weight distribution of the second vehicle system, a size of the second vehicle system, a number of propulsion-generating vehicles in the second vehicle system, an arrangement of the propulsion-generating vehicles in the second vehicle system, or a power-to-weight ratio of the second vehicle system.

Optionally, the characteristic of the one or more routes where the wheel slip occurred includes one or more of a curvature of the one or more routes where the wheel slip occurred or a grade of the one or more routes where the wheel slip occurred.

Optionally, the characteristic of the one or more routes to be traveled by the second vehicle system includes one or more of a curvature of the one or more routes to be traveled by the second vehicle system or a grade of the one or more routes to be traveled by the second vehicle system.

Optionally, the characteristic of the weather condition in which the wheel slip occurred includes one or more of an amount of precipitation where the wheel slip occurred, a type of the precipitation where the wheel slip occurred, a temperature of an environment where the wheel slip occurred, or a humidity of the environment where the wheel slip occurred.

Optionally, the characteristic of the weather condition in which the second vehicle system is to travel includes one or more of an amount of precipitation, a type of the precipitation, a temperature of an environment, or a humidity.

Optionally, controlling the movement of the second vehicle system to prevent the wheel slip from occurring includes reducing a tractive effort generated by a leading propulsion-generating vehicle in the second vehicle system relative to a tractive effort generated by a trailing propulsion-generating vehicle in the second vehicle system during travel of the second vehicle system over the predicted location of wheel slip.

Optionally, controlling the movement of the second vehicle system to prevent the wheel slip from occurring includes reducing a tractive effort generated via a leading axle in a propulsion-generating vehicle in the second vehicle system relative to a tractive effort generated by a trailing axle in the propulsion-generating vehicle in the second vehicle system during travel of the second vehicle system over the predicted location of wheel slip.

Optionally, controlling the movement of the second vehicle system to prevent the wheel slip from occurring includes directing an adhesion modifying device onboard the second vehicle system to automatically apply an adhesion modifying substance onto the predicted location of wheel slip.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like).

Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A system comprising:
   one or more processors configured to identify one or more predicted locations of wheel slip for an upcoming trip of a vehicle system formed from plural vehicles, the one or more processors configured to identify the one or more predicted locations by comparing one or more of a vehicle characteristic, a route characteristic, or a weather characteristic associated with the upcoming trip of the vehicle system with one or more of a vehicle characteristic, a route characteristic, or a weather characteristic associated with one or more previous detections of wheel slip in the vehicle system or in another vehicle system,
   wherein the one or more processors are configured to control movement of the vehicle system during the upcoming trip by one or more of:
      reducing tractive effort generated by a first vehicle of the vehicles in the vehicle system relative to a second vehicle of the vehicles in the vehicle system during movement over the one or more predicted locations,
      reducing tractive effort generated by a leading axle in a selected vehicle of the vehicles in the vehicle system relative to a trailing axle of the selected vehicle during movement over the one or more predicted locations, or
      directing an adhesion modifying device onboard the vehicle system to automatically dispense an adhesion modifying substance onto the one or more predicted locations.

2. The system of claim 1, wherein the vehicle characteristic associated with the upcoming trip and the vehicle characteristic associated with the one or more previous detections of wheel slip respectively include one or more of a total weight of the vehicle system, a weight distribution of the vehicle system, a size of the vehicle system, a number of propulsion-generating vehicles of the vehicles in the vehicle system, an arrangement of the propulsion-generating vehicles in the vehicle system, or a power-to-weight ratio of the vehicle system.

3. The system of claim 1, wherein the route characteristic associated with the upcoming trip and the route characteristic associated with the one or more previous detections of wheel slip respectively include one or more of a grade or a curvature of one or more routes.

4. The system of claim 1, wherein the weather characteristic associated with the upcoming trip and the weather characteristic associated with the one or more previous detections of wheel slip respectively include one or more of an amount of precipitation, a type of the precipitation, a temperature, or a humidity.

5. A system comprising:
   one or more processors configured to obtain one or more of a characteristic of a first vehicle system that experienced wheel slip at a location along one or more routes, a characteristic of the one or more routes where the wheel slip occurred, or a characteristic of a weather condition in which the wheel slip occurred during movement of the first vehicle system,
   wherein the one or more processors also are configured to determine one or more of a characteristic of a second vehicle system, a characteristic of one or more routes to be traveled by the second vehicle system, or a weather condition in which the second vehicle system is or will be traveling,
   wherein the one or more processors are configured to forecast a predicted location where wheel slip will occur for the second vehicle system absent a change to movement of the second vehicle system occurring, wherein the forecast is based on a comparison between:
      the one or more of the characteristic of the first vehicle system, the characteristic of the one or more routes where the wheel slip occurred, or the characteristic of the weather condition in which the wheel slip occurred, and
      the one or more of the characteristic of the second vehicle system, the characteristic of the one or more routes to be traveled by the second vehicle system, or the weather condition in which the second vehicle system is or will be traveling; and
   wherein the one or more processors are configured to direct controlling movement of the second vehicle system to prevent wheel slip from occurring at the predicted location.

6. The system of claim 5, wherein the characteristic of the first vehicle system includes one or more of a total weight of the first vehicle system, a weight distribution of the first vehicle system, a size of the first vehicle system, a number of propulsion-generating vehicles in the first vehicle system, an arrangement of the propulsion-generating vehicles in the first vehicle system, or a power-to-weight ratio of the first vehicle system, and
   wherein the characteristic of the second vehicle system includes one or more of a total weight of the second vehicle system, a weight distribution of the second vehicle system, a size of the second vehicle system, a number of propulsion-generating vehicles in the second vehicle system, an arrangement of the propulsion-generating vehicles in the second vehicle system, or a power-to-weight ratio of the second vehicle system.

7. The system of claim 5, wherein the characteristic of the one or more routes where the wheel slip occurred includes one or more of a curvature of the one or more routes where the wheel slip occurred or a grade of the one or more routes where the wheel slip occurred, and
   wherein the characteristic of the one or more routes to be traveled by the second vehicle system includes one or more of a curvature of the one or more routes to be traveled by the second vehicle system or a grade of the one or more routes to be traveled by the second vehicle system.

8. The system of claim 5, wherein the characteristic of the weather condition in which the wheel slip occurred includes one or more of an amount of precipitation where the wheel slip occurred, a type of the precipitation where the wheel slip occurred, a temperature of an environment where the wheel slip occurred, or a humidity of the environment where the wheel slip occurred, and wherein the characteristic of the weather condition in which the second vehicle system is to travel includes one or more of a forecasted amount of precipitation, a forecasted type of the precipitation, a forecasted temperature of an environment, or a forecasted humidity.

9. The system of claim 5, wherein the one or more processors are configured to direct controlling the movement of the second vehicle system to prevent wheel slip from occurring at the predicted location by directing a leading propulsion-generating vehicle in the second vehicle system to reduce tractive effort relative to a tractive effort generated by a trailing propulsion-generating vehicle in the second vehicle system during travel of the second vehicle system over the predicted location of wheel slip.

10. The system of claim 5, wherein the one or more processors are configured to direct controlling movement of the second vehicle system to prevent wheel slip from occurring at the predicted location by directing a propulsion system to reduce a tractive effort generated via a leading axle in a propulsion-generating vehicle in the second vehicle system relative to a tractive effort generated by a trailing axle in the propulsion-generating vehicle in the second vehicle system during travel of the second vehicle system over the predicted location of wheel slip.

11. The system of claim 5, wherein the one or more processors are configured to direct controlling movement of the second vehicle system to prevent wheel slip from occurring at the predicted location by directing an adhesion modifying device onboard the second vehicle system to automatically apply an adhesion modifying substance onto the predicted location of wheel slip.

12. A method comprising:
determining one or more of a characteristic of a first vehicle system that experienced wheel slip at a location along one or more routes, a characteristic of the one or more routes where the wheel slip occurred, or a characteristic of a weather condition in which the wheel slip occurred during movement of the first vehicle system;
determining one or more of a characteristic of a second vehicle system, a characteristic of one or more routes to be traveled by the second vehicle system, or a weather condition in which the second vehicle system is or will be traveling;
identifying a predicted location where wheel slip will occur for the second vehicle system, absent a change to movement of the second vehicle system occurring, based on a comparison between:
the one or more of the characteristic of the first vehicle system, the characteristic of the one or more routes where the wheel slip occurred, or the characteristic of the weather condition in which the wheel slip occurred, and
the one or more of the characteristic of the second vehicle system, the characteristic of the one or more routes to be traveled by the second vehicle system, or the weather condition in which the second vehicle system is or will be traveling; and controlling movement of the second vehicle system to prevent wheel slip from occurring at the predicted location.

13. The method of claim 12, wherein the characteristic of the first vehicle system includes one or more of a total weight of the first vehicle system, a weight distribution of the first vehicle system, a size of the first vehicle system, a number of propulsion-generating vehicles in the first vehicle system, an arrangement of the propulsion-generating vehicles in the first vehicle system, or a power-to-weight ratio of the first vehicle system.

14. The method of claim 12, wherein the characteristic of the second vehicle system includes one or more of a total weight of the second vehicle system, a weight distribution of the second vehicle system, a size of the second vehicle system, a number of propulsion-generating vehicles in the second vehicle system, an arrangement of the propulsion-generating vehicles in the second vehicle system, or a power-to-weight ratio of the second vehicle system.

15. The method of claim 12, wherein the characteristic of the one or more routes where the wheel slip occurred includes one or more of a curvature of the one or more routes where the wheel slip occurred or a grade of the one or more routes where the wheel slip occurred.

16. The method of claim 12, wherein the characteristic of the one or more routes to be traveled by the second vehicle system includes one or more of a curvature of the one or more routes to be traveled by the second vehicle system or a grade of the one or more routes to be traveled by the second vehicle system.

17. The method of claim 12, wherein the characteristic of the weather condition in which the wheel slip occurred includes one or more of an amount of precipitation where the wheel slip occurred, a type of the precipitation where the wheel slip occurred, a temperature of an environment where the wheel slip occurred, or a humidity of the environment where the wheel slip occurred.

18. The method of claim 12, wherein the characteristic of the weather condition in which the second vehicle system is to travel includes one or more of an amount of precipitation, a type of the precipitation, a temperature of an environment, or a humidity.

19. The method of claim 12, wherein controlling the movement of the second vehicle system to prevent the wheel slip from occurring includes reducing a tractive effort generated by a leading propulsion-generating vehicle in the second vehicle system relative to a tractive effort generated by a trailing propulsion-generating vehicle in the second vehicle system during travel of the second vehicle system over the predicted location of wheel slip.

20. The method of claim 12, wherein controlling the movement of the second vehicle system to prevent the wheel slip from occurring includes reducing a tractive effort generated via a leading axle in a propulsion-generating vehicle in the second vehicle system relative to a tractive effort generated by a trailing axle in the propulsion-generating vehicle in the second vehicle system during travel of the second vehicle system over the predicted location of wheel slip.

* * * * *